(12) United States Patent
Hainbach

(10) Patent No.: US 8,695,906 B2
(45) Date of Patent: Apr. 15, 2014

(54) COMBINATION HERB STORAGE, GRINDER AND POURING CONTAINER

(76) Inventor: Mark Hainbach, Thousand Oaks, CA (US)

( * ) Notice: Subject to any disclaimer, the term of this patent is extended or adjusted under 35 U.S.C. 154(b) by 352 days.

(21) Appl. No.: 13/280,795

(22) Filed: Oct. 25, 2011

(65) Prior Publication Data

US 2012/0097774 A1  Apr. 26, 2012

Related U.S. Application Data

(60) Provisional application No. 61/406,302, filed on Oct. 25, 2010.

(51) Int. Cl.
*A47J 42/00* (2006.01)

(52) U.S. Cl.
USPC ........................ 241/169.1; 241/273.3

(58) Field of Classification Search
USPC ............................ 241/168, 169.1, 273.3
See application file for complete search history.

(56) References Cited

U.S. PATENT DOCUMENTS

| | | | | |
|---|---|---|---|---|
| 6,945,486 | B2 * | 9/2005 | Teng | 241/169.1 |
| 7,367,519 | B2 * | 5/2008 | de Groote et al. | 241/169.1 |
| 7,422,170 | B2 * | 9/2008 | Bao | 241/168 |
| 7,886,999 | B2 * | 2/2011 | Ruzycky | 241/168 |
| D635,413 | S * | 4/2011 | Griffin et al. | D7/693 |
| 8,220,732 | B2 * | 7/2012 | Griffin et al. | 241/169.1 |
| 8,393,563 | B2 * | 3/2013 | Chaoui et al. | 241/168 |
| D689,347 | S * | 9/2013 | Hainbach | D7/693 |

* cited by examiner

*Primary Examiner* — Faye Francis
(74) *Attorney, Agent, or Firm* — Kelly & Kelley, LLP

(57) ABSTRACT

A combination herb storage, grinder and pouring container includes a grinding and pouring cup having grinding elements. A cap is removably attached to the grinding and pouring cup. An herb storage receptacle is nested within the cup and cap. The receptacle defines an herb storage compartment having grinding elements extending therefrom so as to be disposed adjacent to the grinding elements of the cup, so as to selectively grind herbs placed between the storage receptacle and the cup. Preferably, the cup and cap are removably locked to one another, and an airtight and watertight seal formed between the cap, cup and storage receptacle.

18 Claims, 3 Drawing Sheets

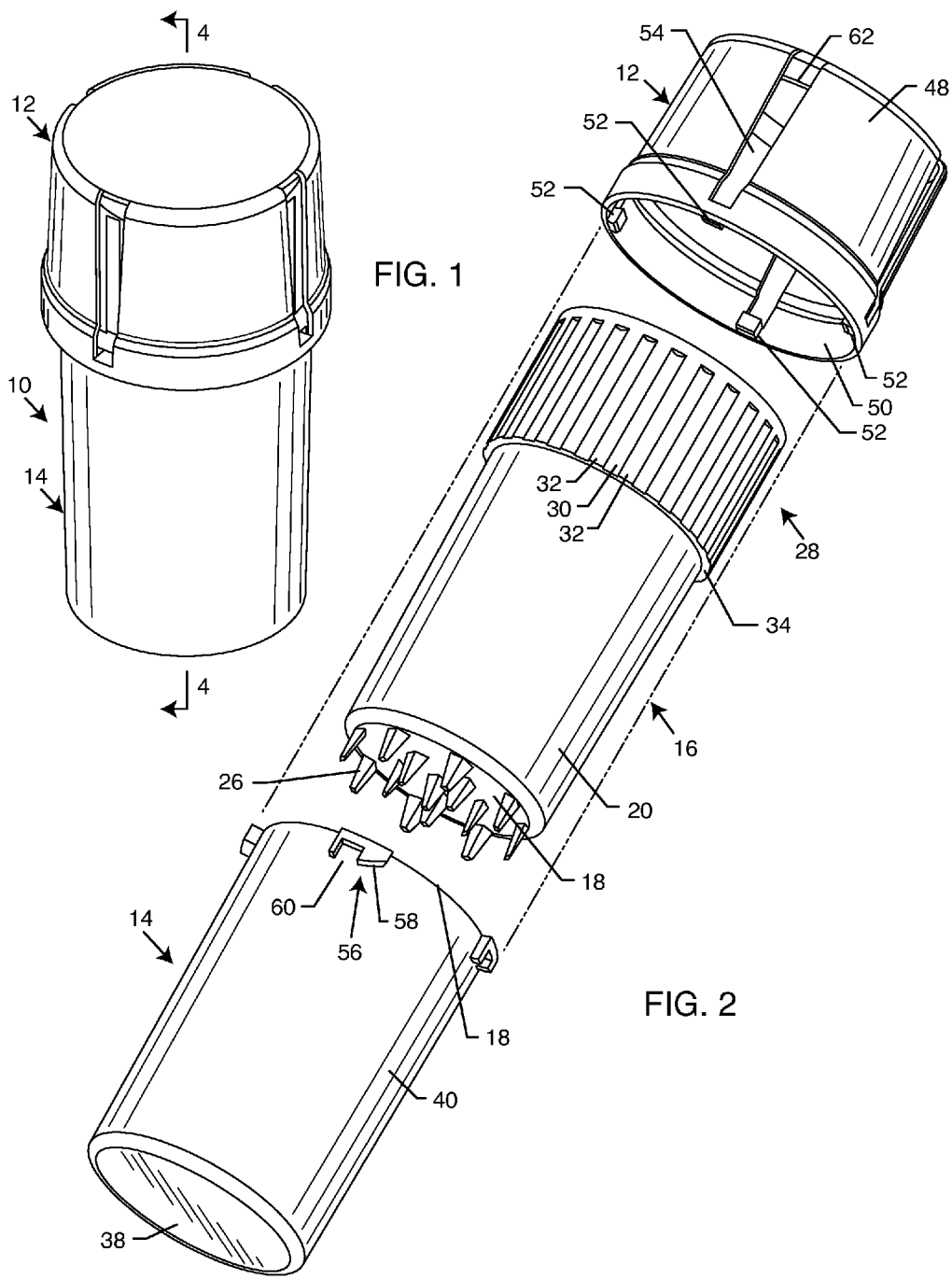

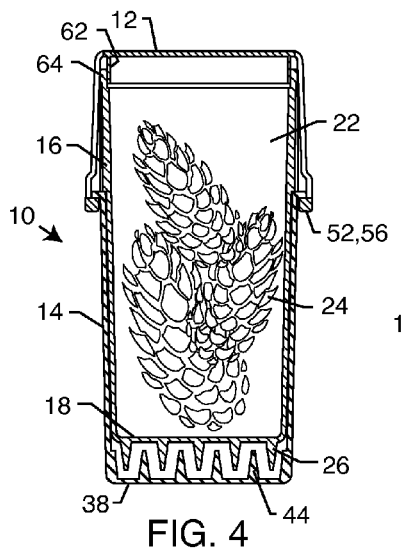
FIG. 4
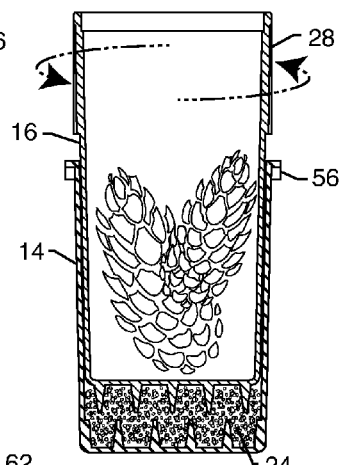
FIG. 6
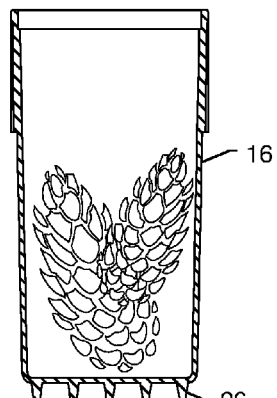
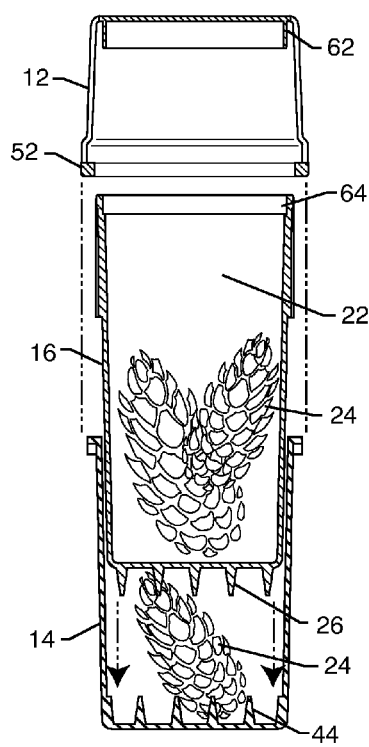
FIG. 5
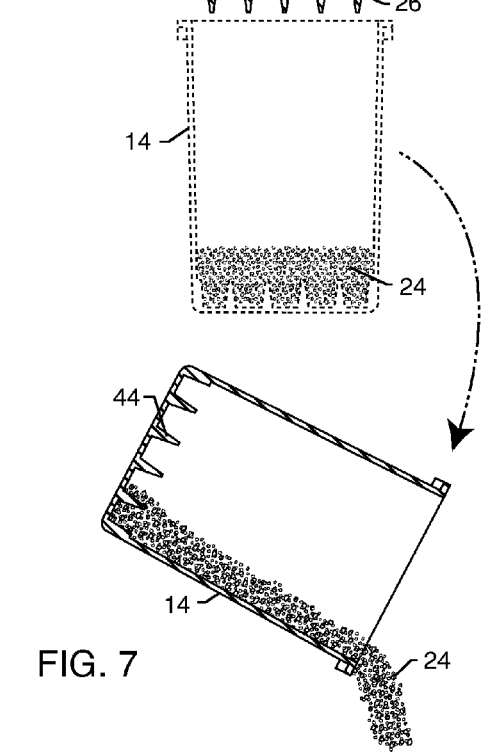
FIG. 7

COMBINATION HERB STORAGE, GRINDER AND POURING CONTAINER

BACKGROUND OF THE INVENTION

The present invention generally relates to storage containers and manual grinders. More particularly, the present invention resides in a combination storage container, manual grinder, and pouring cup for natural or organic remedies including herbs, medicines and the like.

Hand-held manual spice grinders are well known, and commonly used for grinding and storing solid spices, such as pepper corns and other seeds. Typical grinders comprise a static element which has a central bore. An array of teeth project inwardly from the surface of the bore. Within the bore there is a rotatable element which has radially outwardly projecting veins. Peppercorns or other spice seeds are trapped between the veins and the teeth and ground into a powder when the rotatable element is turned. The powder then falls from the grinder, such as directly onto a plate or cooking dish.

While serving adequately to store as well as manually grind spice seeds, such a grinder cannot be used in other applications wherein herbs must be both stored and ground. There are several reasons for this. For instance, the typical spice grinder is able to hold and store the seeds while allowing the seeds to fall through small passageways into the grinding element before being discharged as ground and pulverized spices. However, herbs consisting of leaves and relatively long strands do not readily fall through the apertures of the storage container into the grinding element.

There are instances where the herbs, leaves, or the like are desirably pulverized and ground into a finer material. The herbs are typically purchased in a non-ground state and stored in this manner. Moreover, a specific amount and quantity or dose may be required if the herb is used as medicine, or a particular amount may be desired for the intended purpose. Another example is the grinding of tobacco leaves in an amount desirable for rolling a cigarette or for placement in a pipe so as to be smoked. Typical spice grinders and the like do not allow one to take these factors into consideration.

Presently, such herbs are stored in a manner in which their strong and unique odor may escape from the container and into the area surrounding the stored herbs, such as filling one's automobile, room, etc. with the odor which may be undesirable. The desired amount of herb must be extracted from the storage container and then manually ground using other means or a completely separate grinder. This is not only inconvenient, but once again the unique and strong odor of the herb is not adequately contained in using the cutting and grinding mechanisms and methods currently available.

Accordingly, there is a continuing need for a device which can both store the herb, as well as serve as a grinding device so as to cut and grind the herb to the desired level, while minimizing the odors emanating from the device. The present invention fulfills these needs and provides other related advantages.

SUMMARY OF THE INVENTION

The present invention resides in a combination herb storage, grinder and pouring container which is capable of storing the herbs, serving as a grinding device so as to cut and grind the herbs, as well as easily pour the ground herbs from the container in a controlled manner. The container of the present invention also minimizes or eliminates odors emanating from the container.

The container generally comprises a grinding and pouring cup having grinding elements. A cap is removably attached to the grinding and pouring cup. An herb storage receptacle is nested within the cup and cap, the receptacle defining an herb storage compartment and having grinding elements extending exteriorly thereof so as to be disposed adjacent to the grinding elements of the cup.

Typically, the grinding elements of the cup comprise spaced apart teeth projecting from a base of the cup. The grinding elements of the storage receptacle comprise spaced apart teeth projecting outwardly from a base of the storage receptacle. When an herb is removed from the storage receptacle and placed in the cup, it is ground by placing the storage receptacle into the cup and rotating the storage receptacle with respect to the cup.

A portion of the exterior surface of the storage receptacle may comprise a gripping surface. Typically, the griping surface comprises a corrugated surface extending substantially the outer circumference of an upper portion of the storage receptacle. After grinding, the ground herb is poured from the cup.

The cup and the cap cooperatively form a locking mechanism for removably locking the cap to the cup. A first locking member comprises a tab rotatably moved past a ramp and received within a notch of a second locking member. Typically, multiple spaced apart tabs extend inwardly from a lower rim of the cap. Multiple ramps and notches extend from an exterior surface of the cup in number and position corresponding to the tabs of the cap.

Unlike other grinders, a seal is formed between the cap, the storage receptacle and the cup. The first locking mechanism forms an airtight and watertight connection between the cap and the cup. Moreover, the cap includes a ribbon or ring extending into the cap which frictionally engages with an upper rim of the storage receptacle to create an airtight and watertight seal between the cap and the storage receptacle.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of an assembled container embodying the present invention;

FIG. 2 is an exploded bottom and side perspective view of the container of FIG. 1;

FIG. 4 is a cross-sectional view of the container storing herbs therein;

FIG. 5 is a cross-sectional and diagrammatic view of the container of the present invention with herbs placed between the storage container and the cup;

FIG. 6 is a cross-sectional and diagrammatic view illustrating the rotation of the storage receptacle and cup relative to one another to grind the herb; and FIG. 7 is a cross-sectional and diagrammatic view illustrating the pouring of the ground herbs from the cup.

DETAILED DESCRIPTION OF THE PREFERRED EMBODIMENT

Figure 3:
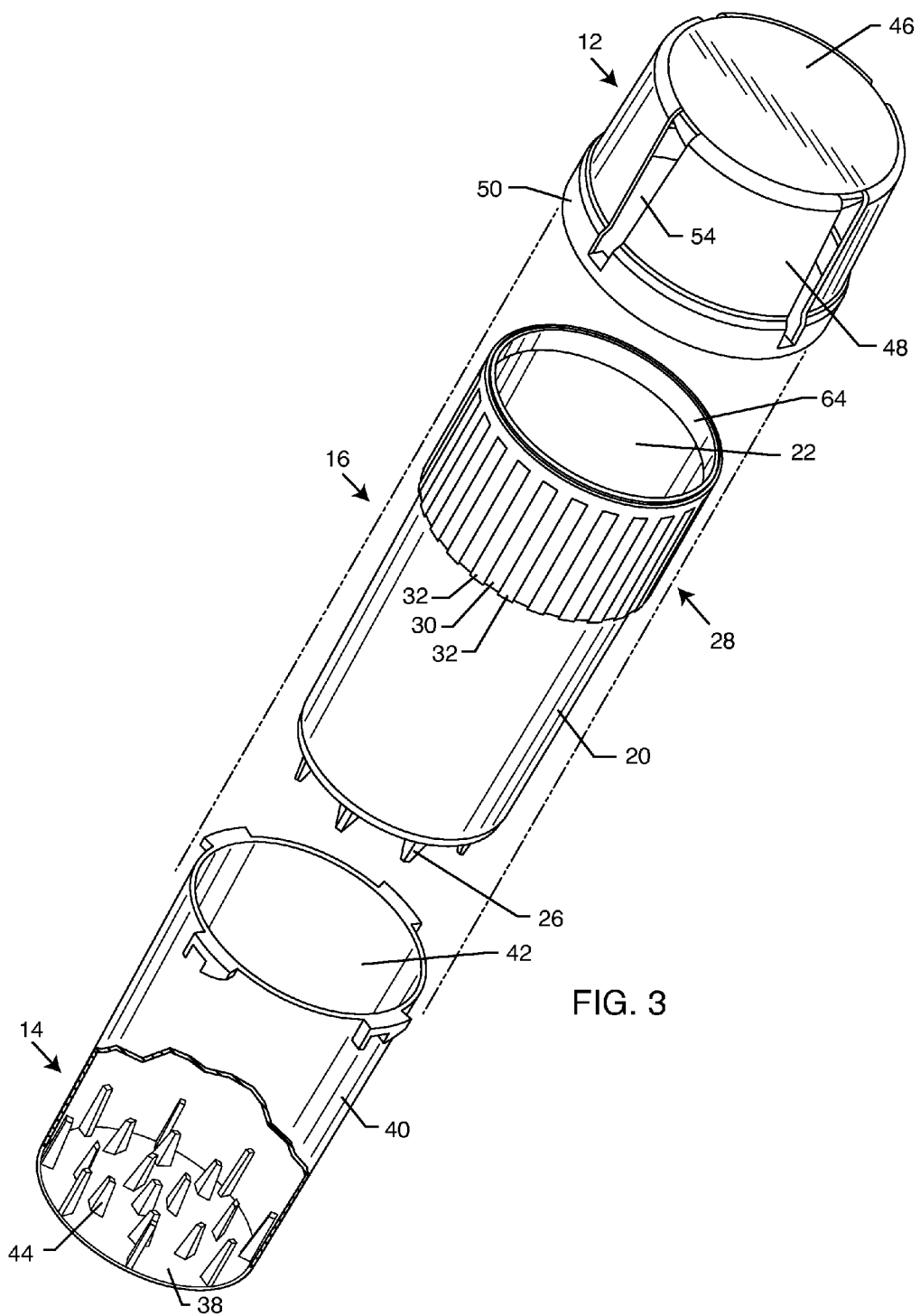
FIG. 3 is a top and side exploded view of the container, partially fragmented to show grinding elements of a cup thereof.

As shown in the accompanying drawings, for purposes of illustration, the present invention is directed to a combination herb storage, grinder and pouring container, generally referred to by the reference number 10 herein. As will be more fully described herein, the container 10 is capable of both storing herbs, being used as a manual grinder of the herbs, and pouring the herbs. The container 10 of the present invention is particularly adapted and suited for storing, grinding, and pouring herbs which are subsequently burned and inhaled, such as tobacco and the like.

With reference now to FIG. 1, a container 10 embodying the present invention is shown in a fully assembled and closed state. Although the container 10 can be made in a variety of sizes, it is typically approximately the size of a medicine pill bottle or film canister or the like. As such, it can be easily carried in one's pants or shorts pocket, purse, or the like. Although the container 10 can be comprised of different materials, in a particularly preferred embodiment the container 10 is molded from a plastic material so as to be light in weight and inexpensive to produce.

With reference now to FIGS. 2 and 3, the container 10 is comprised of a cap 12 which is attachable to a base cup 14 and an herb storage receptacle 16 which is sized and configured so as to be disposed and nested between the cap 12 and cup 14 so as to reside and be encapsulated between the cap 12 and base cup 14.

With continuing reference to FIGS. 2 and 3, the base cup 14 and the storage receptacle 16 are shown as being generally cylindrical. It will be appreciated that other designs, such as a multi-faceted design, could be used, however, as will be more fully described herein, the storage receptacle 16 needs to be able to be placed within the cup 14 and rotated with respect thereto.

The storage receptacle 16 includes a base 18 from which extends a generally cylindrical wall 20 so as to form an inner space 22 for placement and storing of the herbs 24, as illustrated in FIG. 4. Grinding elements 26, in the form of teeth, protrude from the base 18 and are spaced apart from one another. The grinding elements or teeth 26 need to be of such a size so as to withstand and be capable of grinding the herbs 24 without breaking or undue damage thereto. The grinding elements or teeth 26 illustrated herein have multiple facets so as to present grinding edges and surfaces which have been found to be particularly effective.

In a particularly preferred embodiment, the storage receptacle 16 includes a gripping surface 28 on an upper portion thereof. In the embodiment illustrated herein, a plurality of spaced flutes or grooves 30 are formed separated by raised or non-grooved areas 32 to form a corrugated gripping surface. The flutes or grooves 30 are elongated and generally equally spaced apart from one another. The gripping surface 28 enables easy grasping and gripping by the thumb and fingers of the user of the container 10 for both removing the storage receptacle 16 from the cup 14, and for rotating the storage receptacle 16 with respect to the cup 14 during the grinding action, as will be described more fully herein.

It will be appreciated that the outer diameter of the storage receptacle 16 is less than the corresponding inner diameter of the cap 12 and the cup 14. This enables the storage receptacle 16 to be encapsulated and stored between the attached cap 12 and cup 14, as illustrated in FIG. 1. Typically, the storage receptacle 16 is of a greater length than the cup 14 such that the storage receptacle 16 is partially disposed within the cup 14, with the remainder being disposed within the cap 12, as illustrated in FIG. 4. For example, the shoulder 34 of the storage receptacle 16 may engage the upper lip 36 of the cup 14.

With reference now to FIG. 3, the cup 14 includes a base wall 38 having a generally cylindrical wall 40 extending therefrom to form an inner space 42 which is of a sufficient size so as to at least partially receive the storage receptacle 16.

In the illustrated embodiment, the cup 14 also has grinding elements, in the form of teeth 44 extending upwardly from the base 38. The grinding elements or teeth 44 are of a sufficient size and configuration so as to withstand the grinding motion and contact with the grinding elements 26 of the storage receptacle 16. The grinding elements 44 are spaced apart from one another, and may be formed as multi-faceted members, as illustrated, to enhance the grinding effect. The grinding elements 44 are spaced from one another and arranged such that the grinding elements 26 of the storage receptacle 20 can be placed therebetween so as to be adjacent to one another, such as illustrated in FIG. 4.

The cap 12 includes a top wall or surface 46 and a side, generally circumferential, wall 48. At least a portion of the inner diameter of the cap 12 is sufficiently large so as to completely surround the gripping surface 28 of the storage receptacle 16. A lower rim 50 of the cap 12 is also of a diameter so as to extend over the upper portion of the cup 14.

The cap 12 and the cup 14 include locking members forming a locking mechanism such that the cap 12 can be detachably locked to the cup 14 so as to retain the storage receptacle 16 therebetween. As illustrated herein, the first locking members comprising the locking mechanism comprise tabs 52 which are generally spaced apart from one another along rim 50. The illustrated slots 54 in the cap 12 are a result of the molding process in order to create the tabs 52.

Second locking members 56 extend outwardly from the wall 40 of the cup 14 and are configured so as to receive the tabs 52 in a push and turn locking and unlocking manner. The second locking members 56 include a ramp portion 58 across which the corresponding tab 52 is rotated, until the tab 52 is free of the ramp 58 and moves into notch 60. The tabs 52 are disposed within the notch until the cap 12 is pushed downwardly and rotated so as to remove the tabs 52 from the notch and the second locking member 56, such that the cap 12 can be removed from the container 10. It will be appreciated by those skilled in the art that other locking mechanisms and members are also contemplated by the present invention, such as by threaded connection, snap-fit frictional connection or the like. What is important is that the cap 12 and cup 14 be securely attached to one another so as to retain and encapsulate the storage receptacle 16 therein.

In a particularly preferred embodiment, a seal is formed between the cap 12, cup 14 and storage receptacle 16, such that an airtight and watertight fit is formed therebetween. This seal will prevent the odors of the herbs from escaping the container 10 when it is fully assembled, as illustrated in FIG. 1, when the cap 12 and the cup 14 are locked or otherwise secured to one another.

One sealing point is formed between the shoulder 34 and the upper rim 36 when the first locking member tabs 52 are engaged with the second locking member 56. Moving the tabs 52 into locked engagement with the notches 56 brings the shoulder 34 into tight contact with the upper rim 36 of the cup 14. This prevents dust and other small ground particles within the cup 14 from escaping, and the smell and odor thereof from escaping the container 10 as well.

In the illustrated embodiment, a ribbon 62 extends downwardly from the top surface or wall 46 of the cap 12 and into the cap. The ribbon 62 forms a ring which is of a smaller diameter than the inner surface of the wall 48 of the cap 12. The ribbon or ring 62 is configured to be received as a frictional fit within the inner diameter of the upper portion 64 of the storage receptacle 16. In a particularly preferred embodiment, this upper inner portion of the storage receptacle 16 is slightly beveled, such as five degrees, such that the ribbon or ring 62 of the cap 12 can be centered thereto and enter, and become increasingly frictionally fit with the inner surface and upper ring 64 of the storage receptacle 16. Thus the ribbon or ring 62 of the cap 12 and the upper inner beveled ring portion 64 of the storage receptacle 16 forms an airtight and watertight seal therebetween, preventing odor from the herbs 24 from escaping the container 10, while also maintaining the freshness of the herbs 24.

FIG. 4 is a cross-sectional view illustrating the container 10 in a fully closed and assembled state, with herbs 24 stored therein. When it is desired that a portion of the herbs 24 be ground and used, the cap 12 is removed by pushing it and turning it, such as in a counter-clockwise motion so as to disengage the first locking member tabs 52 from the second locking member 56, and so as to expose the inner storage space 22 of the storage receptacle 16.

The storage receptacle 16 is removed from the cup 14, such as by grasping the gripping surface 28 of the storage receptacle 16 and lifting the storage receptacle upwardly and outwardly from the cup 14. A desired amount of herbs 24 is removed from the storage receptacle and placed in the cup 14. The storage receptacle 16 is then reinserted into the cup 14, as illustrated in FIG. 5. The storage receptacle 16 is then grasped by one's thumb and forefingers, or other portion of the hand, about corrugated gripping surface 28 and rotated with respect to the cup 14 while applying downward pressure so as to grind the herb 24 between the grinding element teeth 26 and 44 of the cup 14 and storage receptacle 16, as illustrated in FIG. 6.

Once the herb 24 has been sufficiently ground, the storage receptacle 16 is then lifted outwardly from the cup 14. The cup 14 retains the ground herb 24, as illustrated in FIG. 7, which can be poured in a controlled manner, such as into a pipe, onto smoking paper so as to be rolled to form a cigarette, or the like.

Thereafter, the storage receptacle 16 is again placed within cup 14, and the cap 12 attached to the cup 14, such as by the pushing and turning, in a clockwise manner, such that tabs 52 engage ramps 58 and are inserted into notches 60 of the second locking members 56, creating the seals previously described and encapsulating the nested storage receptacle 16 between the cap 12 and the cup 14.

Although an embodiment has been described in detail for purposes of illustration, various modifications may be made without departing from the scope and spirit of the invention. Accordingly, the invention is not to be limited, except as by the appended claims.

What is claimed is:

1. A combination herb storage, grinder and pouring container, comprising:
    a grinding and pouring cup having grinding elements;
    a cap removably attached to the grinding and pouring cup; and
    an herb storage receptacle nested within the cup and cap, the receptacle defining an herb storage compartment and having grinding elements extending exteriorly thereof so as to be disposed adjacent to the grinding elements of the cup;
    wherein an herb removed from the storage receptacle and placed in the cup is ground by placing the storage receptacle into the cup and rotating the storage receptacle with respect to the cup; and
    wherein the ground herb is poured from the cup.

2. The container of claim 1, wherein the grinding elements of the cup comprise spaced apart teeth projecting from a base of the cup.

3. The container of claim 1, wherein the grinding elements of the storage receptacle comprise spaced apart teeth projecting outwardly from a base of the storage receptacle.

4. The container of claim 1, wherein the cup and cap include first and second locking members cooperatively forming a locking mechanism for removably locking the cap to the cup.

5. The container of claim 4, wherein the first locking member comprises a tab rotatably moved past a ramp and received within a notch of the second locking member.

6. The container of claim 5, wherein the tab comprises multiple spaced apart tabs extending inwardly a lower rim of the cap.

7. The container of claim 6, wherein the second locking member comprises multiple ramps and notches extending from an exterior surface of the cup in number and position corresponding to the tabs of the cap.

8. The container of claim 1, wherein a portion of the exterior surface of the storage receptacle comprises a gripping surface.

9. The container of claim 8, wherein the gripping surface comprises a corrugated surface extending substantially the outer circumference of an upper portion of the storage receptacle.

10. The container of claim 4, wherein a seal is formed between the cap and the cup.

11. The container of claim 10, wherein the first and second locking mechanisms seal the cap and the cup.

12. The container of claim 10, wherein the cap includes a ribbon extending into the cap and frictionally engaging an upper rim of the storage receptacle and creating an airtight and watertight seal between the cap and the storage receptacle.

13. A combination herb storage, grinder and pouring container, comprising:
    a grinding and pouring cup having grinding elements comprising spaced apart teeth projecting from a base of the cup and extending into the cup;
    a cap removably attached to the grinding and pouring cup; and
    an herb storage receptacle nested within the cup and cap, the receptacle defining an herb storage compartment and having grinding elements comprising spaced apart teeth projecting outwardly from a base of the storage receptacle so as to be disposed adjacent to the grinding elements of the cup;
    wherein the cup and cap cooperatively form a locking mechanism for removably locking the cap to the cup;
    wherein a seal is formed between the cap and the cup;
    wherein an herb removed from the storage receptacle and placed in the cup is ground by placing the storage receptacle into the cup and rotating the storage receptacle with respect to the cup; and
    wherein the ground herb is poured from the cup.

14. The container of claim 13, wherein the locking mechanism comprises a first locking member comprising a plurality of tabs extending inwardly a lower rim of the cap and a second locking member comprising multiple ramps and notches extending from an exterior surface of the cup in number and position corresponding to the tabs of the cap, each tab being rotatably moved past the corresponding ramp and received within the corresponding notch to lock the cup and cap to one another.

15. The container of claim 13, wherein a portion of the exterior surface of the storage receptacle comprises a gripping surface.

16. The container of claim 15, wherein the gripping surface comprises a corrugated surface extending substantially the outer circumference of an upper portion of the storage receptacle.

17. The container of claim 13, wherein the first and second locking members seal the cap and the cup.

18. The container of claim 13, wherein the cap includes a ribbon extending into the cap and frictionally engaging an upper rim of the storage receptacle and creating an airtight and watertight seal between the cap and the storage receptacle.

\* \* \* \* \*